Feb. 28, 1967  J. P. KEARNS  3,306,099
OPTICAL ANGULAR POSITION TRANSDUCER
Filed Sept. 30, 1963  2 Sheets-Sheet 1

JOHN P. KEARNS
INVENTOR.

BY Claude Funkhouser

ATTORNEYS

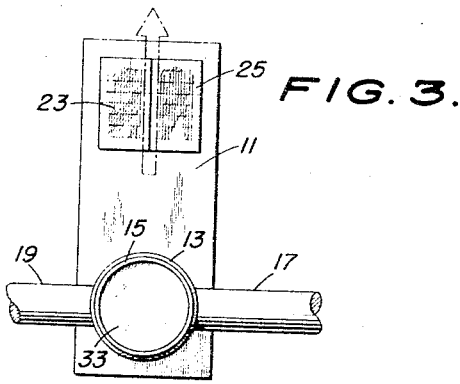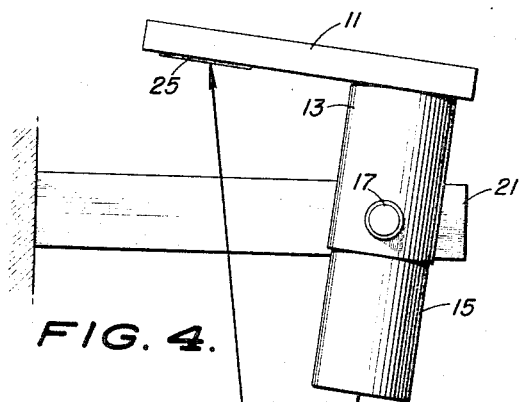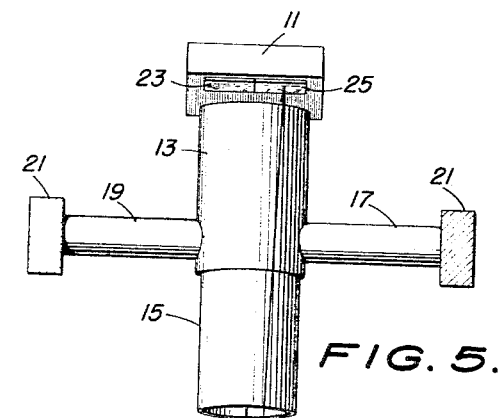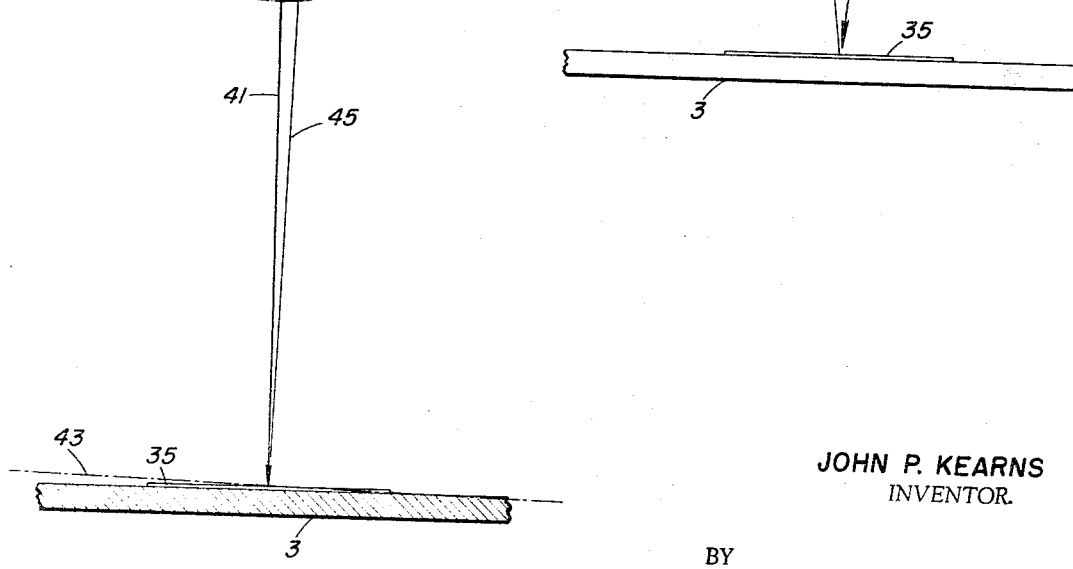

United States Patent Office 3,306,099
Patented Feb. 28, 1967

3,306,099
OPTICAL ANGULAR POSITION TRANSDUCER
John P. Kearns, Silver Spring, Md., assignor to the United States of America as represented by the Secretary of the Navy
Filed Sept. 30, 1963, Ser. No. 312,810
5 Claims. (Cl. 73—67.2)

The present invention relates generally to vibration testing devices and more particularly to an improved optical angular position transducer.

In recent years the art of producing self-excited vibrations to simulate flutter in aerodynamic surfaces has seen rapid advancement. Flutter in aircraft or missile structures is unwanted and ranges in its undesirability from being a mild nuisance, as in the case of sustained annoying vibrations, to a catastrophic phenomenon where divergent and destructive vibrations are produced. This problem of self-excited vibrations involves the interaction of aerodynamic, stiffness, and inertia forces on a structure in such a way that a continuous sinusoidal oscillation is possible at a critical flight speed. When such a condition exists, a small increase in speed is then often sufficient to produce the disastrous effects of divergent vibrations.

In attempting to establish the flutter characteristics of a given configuration, it is extremely desirable to have an intelligent intermediate step between engineering analysis and flight testing since such an intermediate test can improve the estimates. Various ground tests to establish the stiffness and modes of a system in the absence of aerodynamic forces may be used to supplement the analytical process of flutter evaluation. Wind tunnel flutter models are also employed to develop a better understanding of aerodynamic forces interacting with a dynamic system which is intended to represent the real structure as closely as possible.

All these intermediate steps involve a determination of significant structural unknowns which do not emerge clearly from conventional vibration test practices. These unknowns, or elements, when used with computed air force coefficients lead to better estimates of the flutter speed of the aerodynamic surface. The process is indirect and lends itself to errors in interpretation of the vibration test data, particularly when reasonable agreement between the theoretical and experimental modes and frequencies has not been established.

It was desirable to develop a more direct technique for rapid flutter speed determination. Accordingly, a "Flutter Simulator" was developed by the present applicant, which subsequently issued as United States Patent Number 3,015,948. This invention is considered to be a first approximation to the technique and creates, by employing a closed loop or feedback system, a self-excited vibration on the ground which is the same as one to be encountered in flight. The gains in the closed loop ground system are set at levels corresponding to the aerodynamic coefficients which apply to flight at a chosen Mach number and altitude. If the closed loop system produces a self-excited oscillation, then the direct prediction is that flutter would occur at the chosen Mach number and altitude.

In accordance with the teachings of the prior art it is necessary to measure the pitch angle of a plate, which represents an airfoil surface, in order to construct a workable closed loop flutter simulation system. Prior art devices utilized electrical pickups such as the capacitance pickup 23 of FIGURE 1 in U.S. Patent Number 3,015,948 to the present applicant. It is well-known that capacitance pickups possess the virtues of high signal to noise ratio, and little if any observable phase lag. They also possess the vice of non-linearity. The prior art pickups invariably depended upon some type of mechanical linkage for their operation and were never wholly satisfactory. The linkage itself contributed undesirable effects, such as damping and inertia, and the non-linearity of the pickup required difficult calibration techniques.

It was in response to the deficiencies of prior art pickups that the instant invention was developed.

It is an object of this invention, therefore, to provide an electro-optical angular position transducer for use in conjunction with a flutter simulator such as that disclosed in the above-mentioned U.S. patent to the present applicant.

Another object of this invention is to provide an accurate means for pitch angle measurement of surfaces subjected to flutter simulation tests.

Still another object of this invention is to provide a linear pickup for measuring the angular displacement of a surface subjected to flutter simulation tests.

A further object of this invention is to provide an angular position transducer for a flutter simulator wherein no moving mechanical linkage is utilized, thereby resulting in an elimination of the inherent undesirable attributes of the linkage, such as damping and inertia.

And a still further object of the present invention is to provide an extremely accurate, rugged, and linear pickup for sensing the angular displacement of a surface subjected to flutter simulation tests.

The attendant advantages of this invention will be better appreciated and said invention will become clearly understood by reference to the following detailed description when considered in conjunction with the accompanying drawings, illustrating one embodiment of the instant invention, wherein:

FIG. 3 is a bottom view of the optical sensing element of the invention;

FIG. 4 is a side elevation of the optical sensing element of the invention; and

FIG. 5 is a front view of the optical sensing element of the invention.

Figure 1:
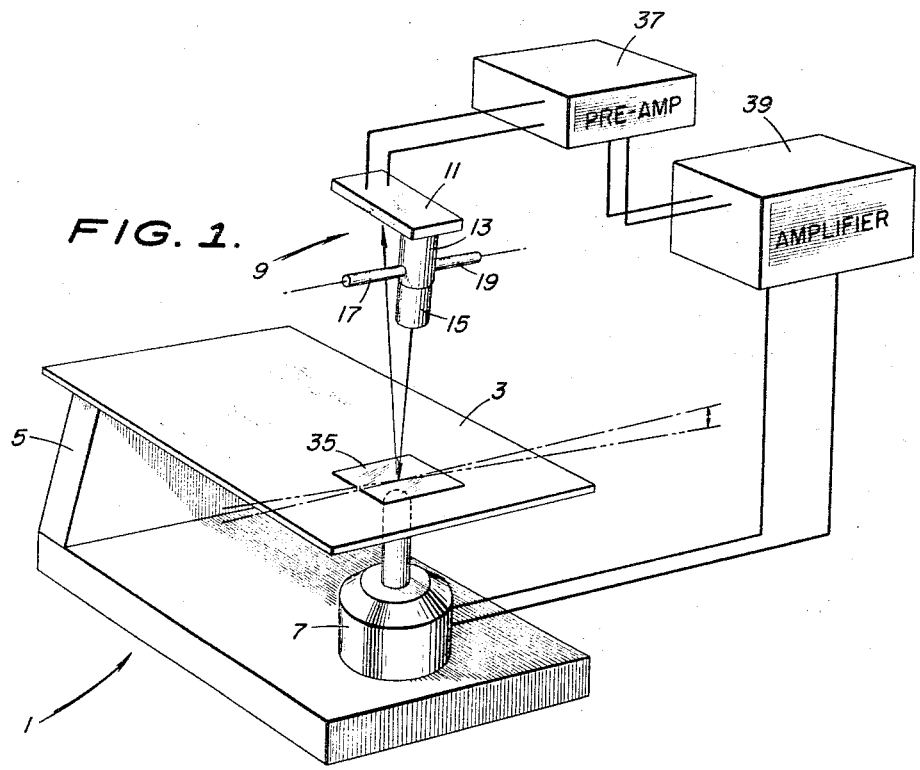
FIG. 1 is a simplified perspective view of the present invention.

Referring now to the drawings, and more specifically to FIG. 1, a flutter simulator, such as that depicted in FIG. 1 of U.S. Patent Number 3,015,948 and issued to the present applicant, is shown at 1, including a plate 3, representing an aerodynamic surface, clamped at one edge to a support 5. A vibrator or shaker 7 is positioned under the plate 3 at a mid-chord point between three-fourths and full span, the direction of span being normal to the line of the clamped edge and the chord line being parallel thereto. The point selected for the position of the shaker 7 represents the location where the distributed air pressures are replaced by a single concentrated force.

For the purpose of measuring the angular deflection of the plate 3 as it acts under the influence of the shaker 7, an electro-optical angular position transducer 9 is provided to replace the angular displacement transducer 16 of FIG. 1 in U.S. Patent Number 3,015,948 mentioned hereinabove.

The transducer 9 includes a rectangular base plate 11 to which is attached a lens barrel support 13. A commercially available lens barrel 15 is mounted partially within the barrel support 13 so as to be able to slide axially therein.

As best seen in FIGS. 1, 4, and 5, the barrel support 13 has dowels 17 and 19 mounted on diametrically opposite portions of its cylindrical surface and extending radially outwardly therefrom. Each of the dowels 17 and 19 is rotatably secured to a supporting bracket 21 to permit the transducer 9 to rotate about an axis coincident with the longitudinal axis of said dowels.

As best seen in FIGS. 2, 3, 4, and 5, identical rectangularly shaped photocells 23 and 25 are mounted on the end portion of one surface of the base plate 11 with their longitudinal edges parallel to the longitudinal axis of said plate 11, and each having one of its longitudinal edges contiguous with one of the longitudinal edges of the other.

Figure 2:
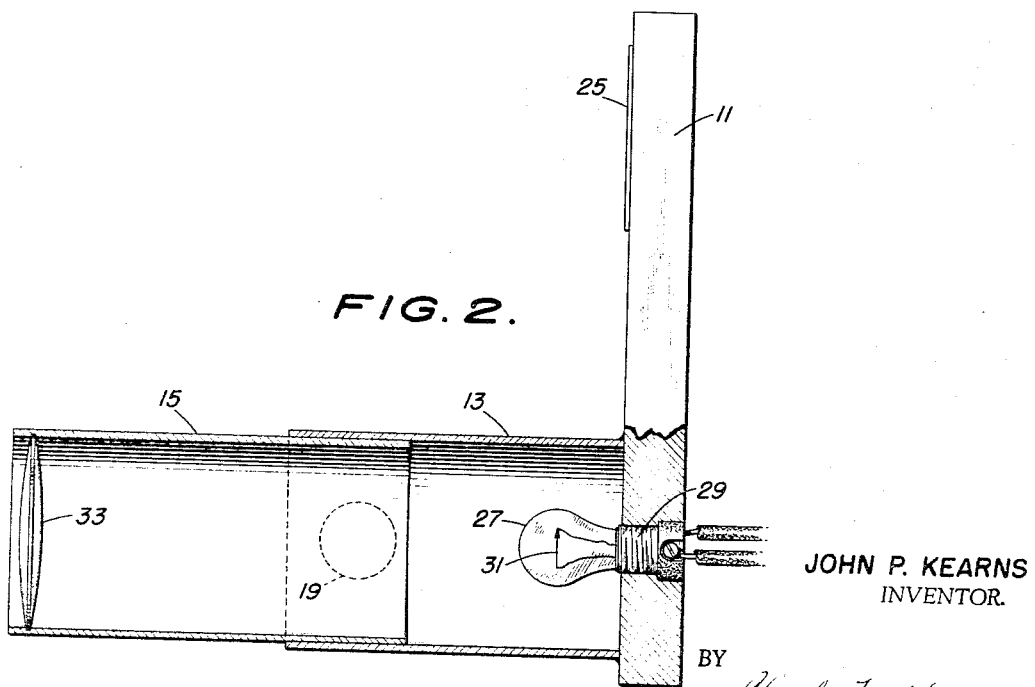
FIG. 2 is a side elevation of the optical sensing element of the invention, partly in section and rotated ninety degrees clockwise from the position shown in FIG. 1.

Referring now to FIG. 2, it is seen that a bulb 27 has its base portion disposed within a socket 29 in the rear portion of the surface of the base plate 11. The bulb 27 extends axially into the barrel support 13, and has an arrow shaped filament 31. A lens 33 is mounted within the forward portion of the lens barrel 15 and serves to focus the image of the arrow shaped filament 31 on a rectangular mirror 35 (FIGS. 1, 4, and 5). The mirror 35 is secured to the surface of the plate 3 in a well-known manner so that its center of symmetry is coincident with the longitudinal axis of the shaker 7.

As best seen in FIGS. 1, 4, and 5, light emanating from the bulb 27 is sent to the mirror 35 and forms an enlarged image of the arrow shaped filament 31 thereupon which is reflected to the photocells 23 and 25. The transducer 9 is initially positioned so that the center of the arrow image will fall on the photocells 23 and 25 coincident with their contiguous longitudinal edges. The transducer 9 is rotated about the longitudinal axis of its dowels 17 and 19 until only the rectangular portion of the arrow image is incident upon the photocells 23 and 25, as shown in FIG. 3.

The photocells 23 and 25 are wired, as by connecting them electrically in parallel, to provide a differential output which is fed to a preamplifier 37, an amplifier 39, and to the shaker 7. The preamplifier 37 is a wide-band D.C. amplifier and feeds an amplified signal to the amplifier 39 which serves as a power amplifier and produces current in the coil (not shown) of the shaker 7 proportional to the input signal voltage and in phase therewith.

When the two photocells 23 and 25 are evenly illuminated, no signal is produce. A movement of the arrow image, created by pitching of the plate 3, produces an output voltage because the photocells 23 and 25 are no longer evenly illuminated.

Referring again to FIG. 5, initially a ray 41 incident on the mirror 35 will be reflected to the common longitudinal center line of the photocells 23 and 25. Pitching of the plate 3 will cause the mirror 35 to move to the position 43 and the reflected ray 45 will shift to another plane and unevenly illuminate the photocells 23 and 25, thereby producing a differential output proportional to the angular shift of the plate 3 and the mirror 35 secured thereto.

It is appropriate at this point to discuss the manner of calibration of the transducer 9. A mask having a small circular aperture of the area $A_o$ therein is placed over the photocells so that light passing through the aperture illuminates one of the photocells 23 or 25. This illumination of one of the photocells causes a voltage to be sent to the preamplifier 37 which emits a voltage output $E_o$. The mask is then removed and the arrow image is allowed to evenly illuminate the photocells 23 and 25.

If the image incident on the two photocells 23 and 25 were to move transversely across the photocells a distance $\delta$ one of the photocells would receive additional illumination having an area $W\delta$, where $W$ is the length of each of the photocells. The other photocell will receive less illumination and the area of the lost illumination would be equal to $-W\delta$.

To each of the aforementioned illumination area changes there correspond a change in voltage at the output of the preamplifier 37 as follows:

For the increase in illumination of one said photocell $$E_i = \frac{E_o}{A_o} W\delta$$

For the decrease in illumination of one said photocell $$E_d = \frac{E_o}{A_o} W\delta$$

The net result or difference between the two voltage changes is the net output $E_T$.

$$E_T = E_i - E_d = \frac{E_o}{A_o}[W+W]\delta \therefore E_T = \frac{E_o}{A_o} W(2\delta)$$

The assumption is made here that both the photocells 23 and 25 are identical. The assumption can be checked, and the above-mentioned process can then be modified to take any cell differences into account.

The value of a fundamental calibration is now available for computing voltage output per unit image shift:

$$E_T/\delta = [E_o/A_o]W(2)$$

It is now possible to find the final voltage per unit angle of pitching. As the plate 3 and its accompanying mirror 35 rotate through an angle $\theta$ the reflected image will travel a distance $\delta$ and the reflected ray will move through an angle $2\theta$ so that:

$\delta = 2L\theta$ where $L$ is the mean distance from the reflected image to the intersection of the reflected ray with the surface of the mirror 35.

Substituting $\delta = 2L\theta$ into the above equation for the voltage output per unit image shift yields:

$$\frac{E_T}{\delta} = \frac{E_T}{2L\theta} = 2\frac{E_o}{A_o}W$$

or:

$$E_T/\theta = \frac{4E_o}{A_o}WL$$

where:

$E_T$ is in volts
$E_o$ is in volts
$\theta$ is in radians
$A_o$ is in square inches
$W$ is in inches, and
$L$ is in inches.

It can readily be seen that many variations and modifications of the present invention are possible in the light of the aforementioned teachings, and it will be apparent to those skilled in the art that various changes in form and arrangement of parts may be made to suit requirements without departing from the spirit and scope of the invention. It is therefore to be understood that within the scope of the appended claims the instant invention may be practised in a manner otherwise than is specifically described herein.

What is claimed is:

1. In combination with a flutter simulator, and a simulated airfoil, an optical angular position transducer for sensing angular displacement of the simulated airfoil and providing an output signal corresponding thereto, including
   a support bracket,
   a lens barrel support pivotably secured to said support bracket so as to be able to rotate about an axis transverse to the longitudinal axis of said barrel support,
   a lens barrel partially disposed within said lens barrel support and axially shiftable therein,
   a light source partially disposed within the lens barrel support,
   a lens disposed within said lens barrel and secured thereto so as to be axially shiftable therewith for focusing light from said light source,
   a plate secured to the aft end of said lens barrel support,
   a pair of differentially wired photocells secured to the same surface of said plate as said lens barrel support and at the opposite end portion therefrom, said photocells being mounted contiguous with each other so that their line of separation is orthogonal to the plane defined by the longitudinal and pivotal axes of said lens barrel support, and reflecting means secured to and adjacent the surface of the simulated airfoil whose angular displacement it is desired to measure, for reflecting light emanating from said light source and incident on said reflecting means, directly onto said photocells.

2. In a device for simulating flutter in an airfoil, an angular position transducer including a light source, a lens focusably secured to said light source, a support bracket for pivotably supporting said light source and said lens whereby they can rotate about an axis transverse to the optical axis of said lens, a pair of differentially wired photocells secured to said light source in spaced relation thereto, a plate for simulating flutter in an airfoil, and a mirror secured to and adjacent said plate for reflecting light focused thereon by said lens directly to said photocells, whereby angular displacement of said plate will result in a change in the illumination of each said photocell resulting in an electrical signal output proportional to said angular displacement of said plate.

3. In a device for simulating flutter in an air-foil, the combination including, a base, a plate secured at one end parallel to said base and in spaced relation thereto, a shaker secured to said base beneath said plate, a mirror secured to the outer surface of said plate above said shaker, a supporting bracket, a light source pivotably secured to said supporting bracket outwardly of said mirror so as to be able to rotate in a plane perpendicular to said plate, and passing through the longitudinal axis thereof, a pair of differentially wired photocells secured to said light source rearwardly and outwardly thereof so that light incident on said mirror from said light source will be reflected onto said photocells, whereby chordwise angular displacement of said plate will cause a change in the illumination of each of the photocells which will be transduced into a single electrical output signal, a preamplifier connected to said photocells for receiving electrical output signals therefrom and providing amplification thereof, and an amplifier connected to said preamplifier for power amplification of output signals therefrom to provide an output current to said shaker in phase with the voltage output of said preamplifier and said photocells and proportional to the angular displacement of said plate.

4. An angular position transducer in combination with a flutter simulator, including plate means for simulating an airfoil, reflecting means mounted on said plate means for reflecting photo-images incident thereon, photo-image producing means, projecting means for focusing images produced by said photo-image producing means onto said reflecting means, transducing means connected to said image producing means and said projecting means for receiving photo-images from said reflecting means and producing electrical output signals, whereby when said plate means is subjected to chordwise flexure the photo-image incident on said transducing means will undergo a linear displacement thereby inducing said transducing means to emit an electrical signal proportional to the clockwise angular displacement of said plate means, and support means having said photo-image producing means and said projecting means pivotably secured thereto to permit rotation in the spanwise direction of said plate means, resulting in a corresponding linear displacement of the photo-image incident on said transducing means which will cause a signal to be issued from said transducing means, thus permitting adjustment of said angular position transducer for calibration purposes.

5. An optical position transducer, including image producing means for creating photo-images, reflecting means for reflecting images incident thereupon from said image producing means, a pair of photocells electrically connected in parallel and secured adjacent each other in spaced relation with said image producing means with their contiguous edges parallel to the longitudinal axis of said reflecting means, whereby photo-images reflected upon said photocells from said reflecting means will be linearly displaced in a direction parallel to the longitudinal or transverse axis of said reflecting means when said reflecting means undergoes angular displacement from its longitudinal or transverse axis, respectively, and cause an electrical signal to be emitted from said photocells proportional to the angular displacement of said reflecting means from its transverse axis, or the linear displacement of said photo-image incident on said photocells, in a direction normal to that of their contiguous edges, only, and support means for pivotably securing said image producing means and said photocells so that they may rotate and cause the photo-image incident upon said photocells to be linearly displaced in a direction parallel to the contiguous edges of said photocells for calibration purposes.

References Cited by the Examiner
UNITED STATES PATENTS

| | | | |
|---|---|---|---|
| 2,065,365 | 12/1936 | Doyle et al. | 250—209 |
| 2,067,613 | 1/1937 | McMaster | 250—231 |
| 2,625,659 | 1/1953 | Mendelson | 73—67.4 X |
| 2,734,735 | 2/1956 | Payne | 73—141 X |
| 3,015,948 | 1/1962 | Kearns | 73—67.2 |

RICHARD C. QUEISSER, Primary Examiner.

C. A. RUEHL, Assistant Examiner.